(12) United States Patent
Ahlgren et al.

(10) Patent No.: US 9,140,843 B2
(45) Date of Patent: Sep. 22, 2015

(54) CHANGING GRAPHICS IN AN APPARATUS INCLUDING USER INTERFACE ILLUMINATION

(71) Applicant: Core Wireless Licensing S.A.R.L., Luxembourg (LU)

(72) Inventors: Pentti Ahlgren, Helsinki (FI); Pauli Laitinen, Helsinki (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 14/260,878

(22) Filed: Apr. 24, 2014

(65) Prior Publication Data

US 2014/0233260 A1 Aug. 21, 2014

Related U.S. Application Data

(63) Continuation of application No. 12/309,014, filed as application No. PCT/FI2006/000238 on Jul. 3, 2006, now Pat. No. 8,740,443.

(51) Int. Cl.
*F21V 7/04* (2006.01)
*F21V 8/00* (2006.01)
*G02B 6/34* (2006.01)

(52) U.S. Cl.
CPC ............. *G02B 6/0013* (2013.01); *G02B 6/006* (2013.01); *G02B 6/0028* (2013.01); *G02B 6/0036* (2013.01); *G02B 6/0068* (2013.01); *G02B 6/0073* (2013.01); *G02B 6/34* (2013.01)

(58) Field of Classification Search
CPC .. G02B 6/0036; G02B 6/0035; G02B 6/0033; G02B 6/005; G02B 6/0053; G02B 6/0038; G02B 6/0016; G02B 6/0043; G02B 6/0045; G02B 6/0058; G02B 6/0015; G02B 6/002; G02B 6/34
USPC .................................................. 362/600–634
See application file for complete search history.

(56) References Cited

U.S. PATENT DOCUMENTS

2006/0256581 A1* 11/2006 Hwang et al. ................. 362/619

FOREIGN PATENT DOCUMENTS

WO    WO-2006048393 A2    5/2006

* cited by examiner

*Primary Examiner* — William Carter
(74) *Attorney, Agent, or Firm* — Core Wireless Licensing

(57) ABSTRACT

An apparatus includes a light guide. A first light input section receives light in a first direction into said light guide. First direction-dependent outcoupling structures selectively couple out light propagating in said first direction in said light guide. A second light input section receives light in a second direction into said light guide. Said second direction is different than said first direction. Second direction-dependent outcoupling structures selectively couple out light propagating in said second direction in said light guide.

20 Claims, 6 Drawing Sheets

CHANGING GRAPHICS IN AN APPARATUS INCLUDING USER INTERFACE ILLUMINATION

CROSS-REFERENCE TO RELATED APPLICATIONS

This patent application is a continuation application of U.S. patent application Ser. No. 12/309,014, filed on Sep. 22, 2009. U.S. patent application Ser. No. 12/309,014 is a national-stage filing of International Patent Application No. PCT/FI2006/000238, filed on Jul. 3, 2006. U.S. patent application Ser. No. 12/309,014 and International Patent Application No. PCT/FI2006/000238 are incorporated herein by reference.

FIELD OF THE INVENTION

The invention concerns generally the technology of light guides in electronic devices. Especially the invention concerns the ways in which light is coupled out from a light guide.

BACKGROUND OF THE INVENTION

Light guides are used in electronic devices to conduct light from one or more light sources to desired locations. As examples, there are known backlighted liquid crystal displays and illuminated keypads. Prior art solutions for uniformly illuminating a backlighted liquid crystal display are known for example from US 2005/0052732 A1; U.S. Pat. No. 6,592,233 B1; and US 2005/0213348 A1. Keypad illumination solutions are known for example from US 2005/0202787 A1; U.S. Pat. No. 6,550,927 B1; and U.S. Pat. No. 6,006,118 B1. A publication WO 03/047222 A1 discloses a combined solution for backlighting a display and illuminating a keypad with common components for generating and distributing light.

In some cases it is desirable to make the visual appearance of a user interface change depending on some affecting factor. For example, if the keys of a keypad have graphical markings on them to help the user visualize, which characters and/or functions are associated with each key, and such associations may vary depending on e.g. an operating mode of an electronic device that contains said keypad, it would increase the convenience of using the device if the correct key markings would appear in the correct orientation in each case.

SUMMARY OF THE INVENTION

The present invention aims at providing an apparatus in which graphical user interface features appear differently under different conditions.

The objectives of the invention are achieved by providing for the propagation of light inside a light guide selectively in at least two clearly distinct general directions, and using direction-dependent outcoupling structures on at least one surface of the light guide, so that depending on the general propagation direction of light inside the light guide, light is coupled out differently due to the orientation of the outcoupling structures.

An apparatus according to the invention is characterised by the features recited in the characterising part of the independent claim directed to an apparatus.

A communications device according to the invention is characterised by the features recited in the characterising part of the independent claim directed to a communications device.

A structural module according to the invention is characterised by the features recited in the characterising part of the independent claim directed to a structural module.

A method according to the invention is characterised by the features recited in the characterising part of the independent claim directed to a method.

A computer program product according to the invention is characterised by the features recited in the characterising part of the independent claim directed to a computer program product.

Features that affect the propagation of light in some relatively strictly defined general direction or general directions inside a light guide include (but are not limited to) selecting the location(s) of light source(s) appropriately in relation with the light guide, selectively switching on and off light sources if there are at least two of them, arranging the incoupling of light from the light source(s) into the light guide in a suitable way, and selecting a suitable form and material for the light guide. Structures on the surfaces of the light guide play an important role in defining, how light is coupled out from the light guide.

A direction-dependent outcoupling structure is such that causes light to be emitted out of the light guide differently depending on the propagation direction of the light inside the light guide. Examples of known direction-dependent outcoupling structures include, but are not limited to, diffraction gratings, prisms and prism arrays. By using a suitable distribution of direction-dependent outcoupling structures, it is possible to select an area of the light guide that has a desired form and that couples out much more light that propagates in one direction inside the light guide than light that propagates in other directions inside the light guide.

An example of applying this principle is a keypad structure that includes an essentially planar light guide as well as light sources that are configured to selectively cause light to propagate inside the light guide in at least two distinct general directions. Coincident with the location of at least one key, a surface of the light guide has direction-dependent outcoupling structures. If light is made to propagate inside the light guide in a first general direction, light is coupled out at the location of said key in a first way. If light is made to propagate inside the light guide in a second general direction, light is coupled out at the location of said key in a second way, which is different than said first way. For example, in the first-mentioned case the light coupled out at the location of said key may appear to a human user as a first illuminated character, and in the second case the light coupled out may appear to the user as a second, different character.

In order to create conditions in which light from an essentially point-like source at an edge of a light guide does not spread into all angles but is significantly collimated, it is possible to design the edge form of the light guide near to the light source so that reflections from nearby edges limit the angles into which light will propagate.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF EMBODIMENTS OF THE INVENTION

Figure 1A:
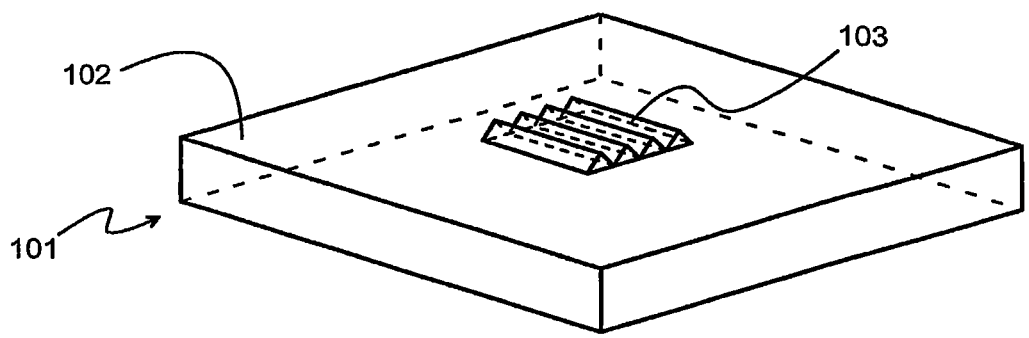
FIGS. 1a, 1b and 1c illustrate the concept of direction-dependent outcoupling structure.
Figure 1B:
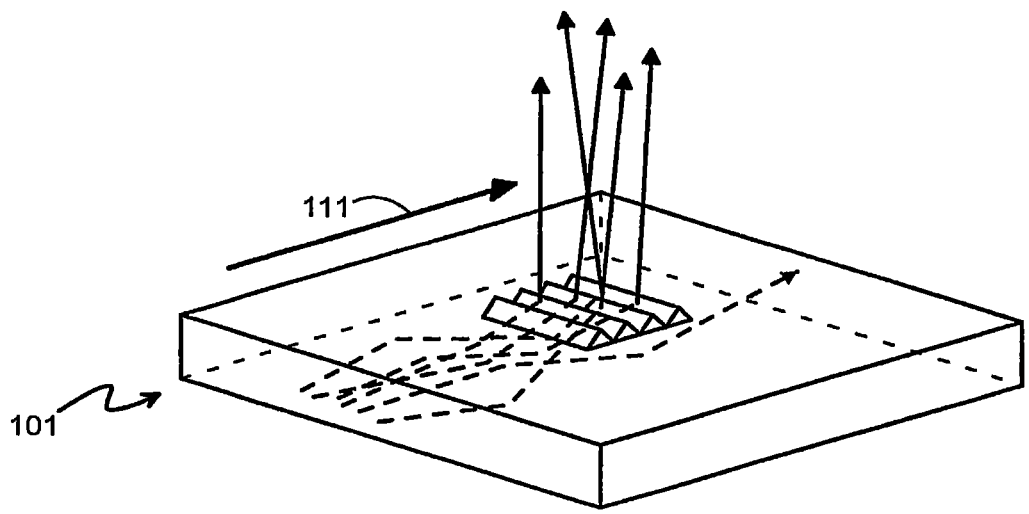
Figure 1C:
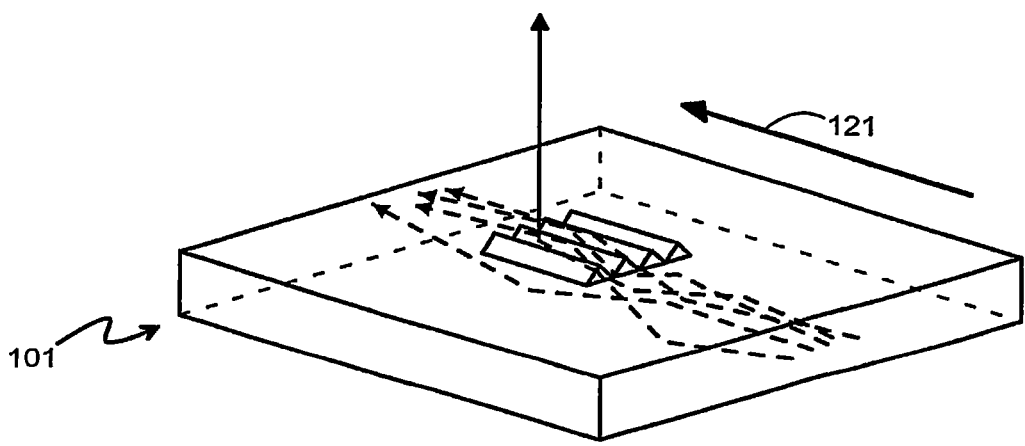

FIGS. 1a, 1b and 1c illustrate the concept of direction-dependent outcoupling structure. In this exemplary case a light guide 101 has a surface 102. The light guide 101 is essentially planar in this case, and the surface 102 is one of the sides that limit the light guide 101 in the plane of its planarity. At one location on the surface 102 the material of the light guide constitutes an array of parallel elongated prisms 103. If light is made to propagate inside the light guide 101 in a first general propagation direction 111, which is perpendicular to the longitudinal direction of the elongated prisms 103, reflection effects caused by the prisms cause a relatively large portion of the light to be coupled out of the light guide as in FIG. 1b. If, however, light is made to propagate inside the light guide 101 in a second general propagation direction 121, which is parallel to the longitudinal direction of the elongated prisms 103, the prisms 103 cause only relatively weak outcoupling as in FIG. 1c. In the case of FIG. 1b a human user would perceive an illuminated spot at the location of the elongated prisms 103, while in the case of FIG. 1c the user would hardly notice the small amount of outcoupled light.

The concept of a general propagation direction of light may be defined so that it is the direction in which the intensity of light is the largest. In arrangements according to the present invention, it is seldom possible to collimate light into very strictly collimated beams, but light will always have a certain distribution of propagation directions around the general propagation direction. Later we will discuss in more detail the allowable limits of how much light can deviate from the general propagation direction and still be acceptable for producing changing graphics.

Instead of prisms one could use other kinds of direction-dependent outcoupling structures to create a similar effect. A basic difference concerning outcoupling structures in general is the difference between diffractive and geometric optics. Diffractive outcoupling structures have characteristic dimensions in the same order of magnitude as the wavelength of light. Indeed, diffractive optics may be used to create strongly wavelength-dispersive effects. On the other hand, it is difficult to create a diffractive outcoupling structure that would affect all wavelengths of visible light in the same way. In other words, it is difficult to couple out white light from a light guide by using diffractive outcoupling structures. A simple diffractive outcoupling structure that also has directional dependency is a number of thin parallel lines (scratches, ridges, opaque traces, or the like) with the separation between adjacent lines in the order of the wavelength of light. Such an arrangement is frequently referred to as a diffractive grating.

Geometric outcoupling structures have characteristic dimensions that are significantly larger than the wavelengths of visible light. The array of parallel, elongated prisms 103 in FIGS. 1a to 1c could have a period (i.e. perpendicular distance between top edges of adjacent prisms) in the order from several micrometers to over a hundred micrometers, for example 20 micrometers. Although all prismatic structures inherently involve some degree of angular dispersion of wavelengths, considering overall intensities the outcoupling effect of a geometric outcoupling structure is the same for all wavelengths of visible light. Incident light rays inside the light guide are in general not very strictly collimated but have an angular distribution when they hit the outcoupling structure. The additional variety in the different ways in which a particular ray is outcoupled eventually results in a human user perceiving the spectral content of the geometrically outcoupled light to be essentially the same as that of the incident light, independently of viewing direction.

Light guides with direction-dependent outcoupling structures are mostly manufactured from plastics. The smaller the desired structural features, the more difficult the manufacturing process tends to get and the more there are needed special tools like electron beam lithography. From the manufacturing point of view geometric outcoupling structures are often better than diffractive ones, because due to their larger dimensions they are easier to manufacture to the desired dimensional accuracy in large-scale mass production. Basically the direction-dependent outcoupling structures that are used for the purposes of the present invention could be based on either diffractive or geometric optics, or both.

Figure 2:
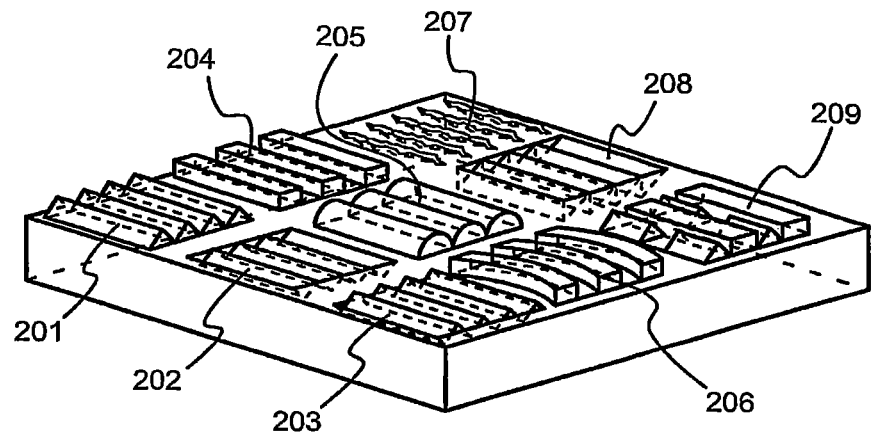
FIG. 2 illustrates some alternative prism structures.

FIG. 2 displays some possible variations around the theme of geometric direction-dependent outcoupling structures. Elongated prisms may protrude out of a surface like in 201, or they may be sunk into the surface like in 202, or they may be both partially protruding and/or partially sunk like in 203. The cross-section of elongated prisms need not be triangular, but it can be for example rectangular like in 204 or rounded like in 205. It is not necessary to make the elongated prisms exactly straight in their longitudinal direction, but they can be for example slightly curved like in 206. Even quite irregularly shaped scratches 207 may act as geometric direction-dependent outcoupling structures. The cross-section of elongated prisms does not need to be symmetrical; also asymmetrical cross-sections are possible like in 208. One "pixel", or a confined two-dimensional area of the light guide surface that only contains direction-dependent outcoupling structures associated to one general propagation direction of light, does not need to contain only mutually identical structures, but dimensions like the cross-sections and lengths of such adjacent structures of the same pixel may vary like in 209.

The operation of and effects caused by direction-dependent outcoupling structures are practically quite similar independently of whether they are located on the "front" or "back" surface of a light guide. The term "front" surface commonly refers to that surface through which light is directed towards the eyes of a user, while the term "back" surface refers to the opposite surface of the light guide. The directional terms "front" and "back" do not include any limiting connotations that would limit the use of a light guide according to an embodiment of the invention in any particular direction. It is possible to use a reflector on the side of the "back" surface to ensure that light is not wasted by directing it away from the user. A light guide according to an embodiment of the invention may have direction-dependent outcoupling structures on its front surface, on its back surface, or both on its front and on its back surfaces. In one example, direction-dependent outcoupling structures of one characteristic orientation are located on one surface of the light guide, and direction-dependent outcoupling structures of another characteristic orientation are located on another surface of the light guide. At least theoretically it is even possible to produce outcoupling structures even inside the light guide, for example by focusing a laser beam suitably, but considering mass production it is believed to be much more advantageous to have the outcoupling structures on surfaces only.

Figure 3:
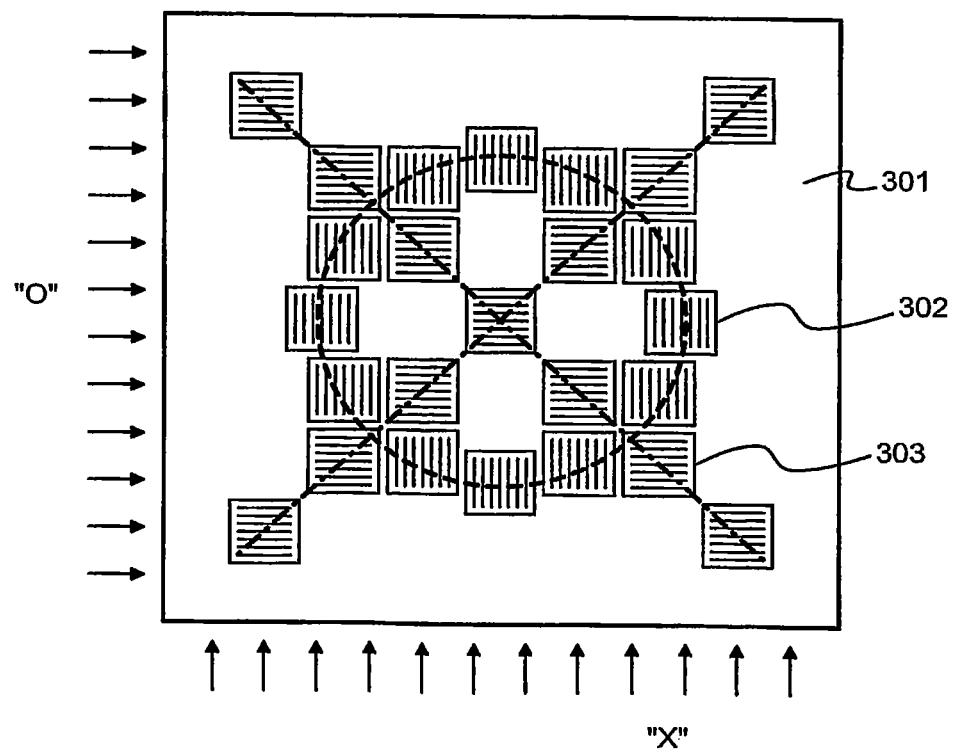
FIG. 3 illustrates the formation of patterns from differently oriented pixels.

FIG. 3 is a top view of a light guide 301 that has two types of direction-dependent outcoupling structures distributed on its surface. These appear schematically as square-formed pixels, with parallel lines inside the pixel indicating a principal longitudinal direction of elongated outcoupling structures within the pixel. In accordance with what has been explained above about the direction-dependent outcoupling of light, for example pixel 302 couples out light that propagates inside the light guide 301 in the horizontal direction, while for example pixel 303 couples out light that propagates inside the light guide 301 in the vertical direction. The direction from left to right is designated as the "O" direction in FIG. 3, and the direction from bottom to top is the "X" direction. Making light propagate in the light guide in the "O" direction (or the opposite direction) causes a human user to perceive an illuminated graphic marking "O" on the surface of the light guide. This illuminated graphic marking consists of light that is coupled out of all pixels having their elongated outcoupling structures oriented vertically in FIG. 3. Correspondingly making light propagate in the light guide in the "X" direction (or the opposite direction) causes a human user to perceive an illuminated graphic marking "X" on the surface of the light guide. The dashed-line O and the dash-dot line X in FIG. 3 are only drawn in FIG. 3 to facilitate easier discerning of which pixels constitute which marking.

Figure 4:
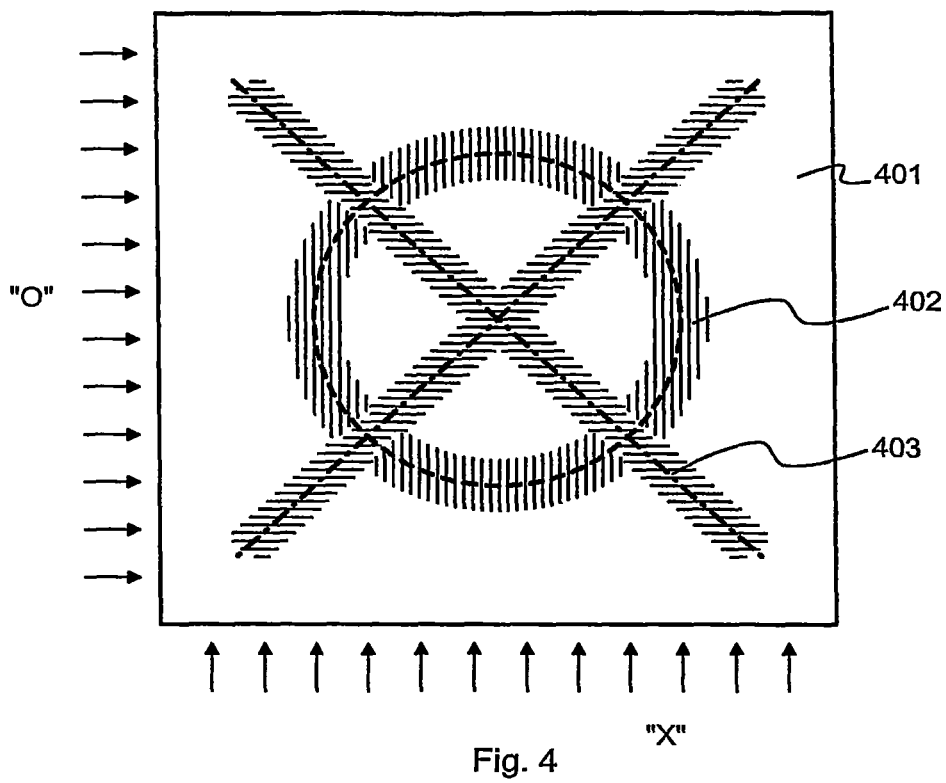
FIG. 4 illustrates the formation of patterns from areas of differently oriented direction-dependent outcoupling structures.

It is not obligatory to compose the intended illuminated graphics of discrete pixels. FIG. 4 illustrates a light guide 401 that in practice produces a very similar graphics-changing effect like that of FIG. 3, but so that the graphic marking "X" consists of an essentially continuous, X-formed area 403 where a surface of the light guide 401 comprises parallel, horizontally directed, elongated prisms. The graphic marking "O" consists of four separate segments of an O-formed area 402 where a surface of the light guide 401 comprises parallel, vertically directed, elongated prisms.

Figure 5:
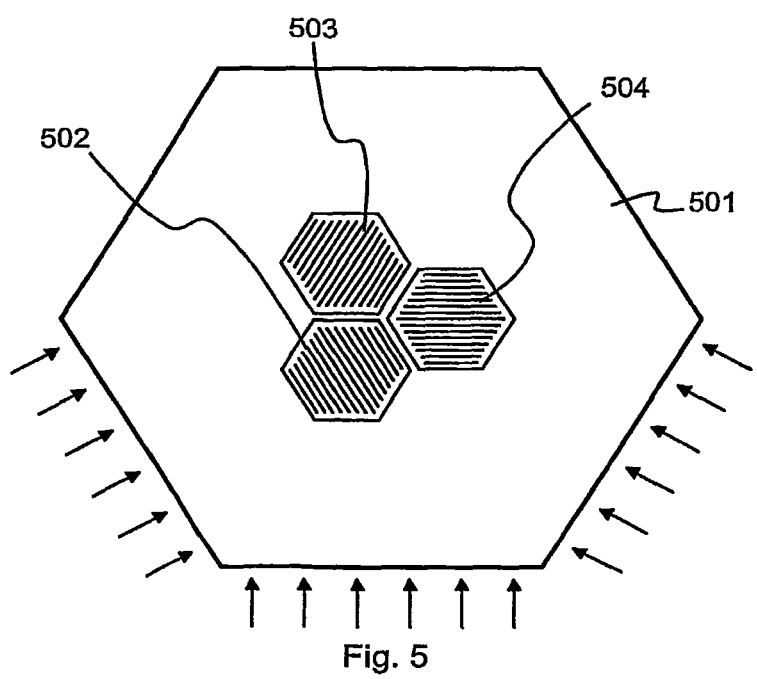
FIG. 5 illustrates one possible light guide.

The number of different general propagation directions in the light guide—and thus the number of selectively illuminated mutually alternative graphic markings—is not necessarily just two. FIG. 5 illustrates a light guide 501 that has direction-dependent outcoupling patches 502, 503 and 504 with three different orientations on its surface. Each of them couples out most light, and consequently appears as most brightly illuminated, when light propagates inside the light guide in a direction that is perpendicular to the longitudinal direction of the appropriate elongated outcoupling structures. Three different general propagation directions of light are shown. However, it should be noted that light in any propagation direction will be coupled out to some extent through all patches 502, 503 and 504, because in no case will any of the three illustrated propagation directions be parallel with any elongated outcoupling structures. The more there are different general propagation directions, the smaller is the angular separation between them, and consequently the more crosstalk between directions is to be expected.

Even if the number of different general propagation directions in the light guide is two, these directions are not necessarily exactly perpendicular. The outline and general design of an electronic apparatus or other reasons may dictate that a user interface feature that involves a light guide may be slightly diamond-shaped, so that the two general propagation directions are at a slightly oblique angle against each other. Again it should be noted that the more the angle between two general propagation directions differs from 90 degrees, the more crosstalk is likely to appear. Thus a solution where general propagation directions are not perpendicular, either because there are more of them than two or because of other reasons, is most advantageous for solutions where the changing graphics do not need to consist of mutually completely exclusive illuminated areas: it is possible to design graphics that change their appearance because some parts thereof become more brightly illuminated than others.

Figure 6:
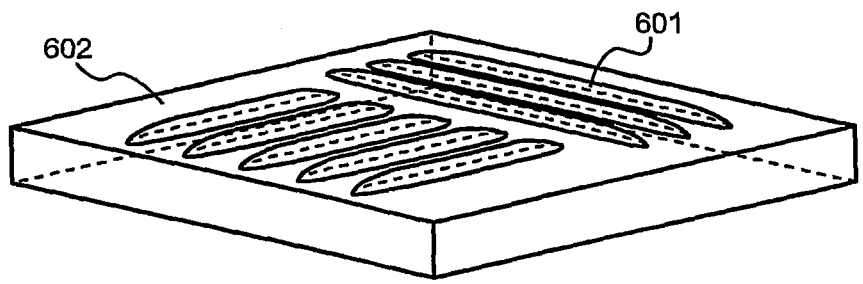
FIG. 6 illustrates one possible form of prisms.

In embodiments of the invention where there are two perpendicular general propagation directions of light, and the direction-dependent outcoupling structures are elongated prisms, one major source of crosstalk is light that propagates in the light guide in the longitudinal direction of prisms (and thus should not be outcoupled) but hits the end facets of prisms. FIG. 6 illustrates one possible way of reducing unwanted outcoupling caused by end facets: the elongated prisms 601 on the surface of the light guide 602 do not have end facets at all, because their ends rise smoothly from the surface of the light guide 602. The same principle of making the prism ends smoothly curved instead of using planar end facets is easily generalised to all kinds of prism cross-sections, regardless of whether the prisms are protruding out of the light guide surface or whether they are defined by recesses in the light guide surface.

Above we have just assumed that light has been made to propagate inside the light guide, without paying attention to how it originally got there. Next we will consider certain aspects of how light is generated and coupled into the light guide. The part of a light guide that is designed to receive light into the light guide can be designated as the light input section.

Figure 7:
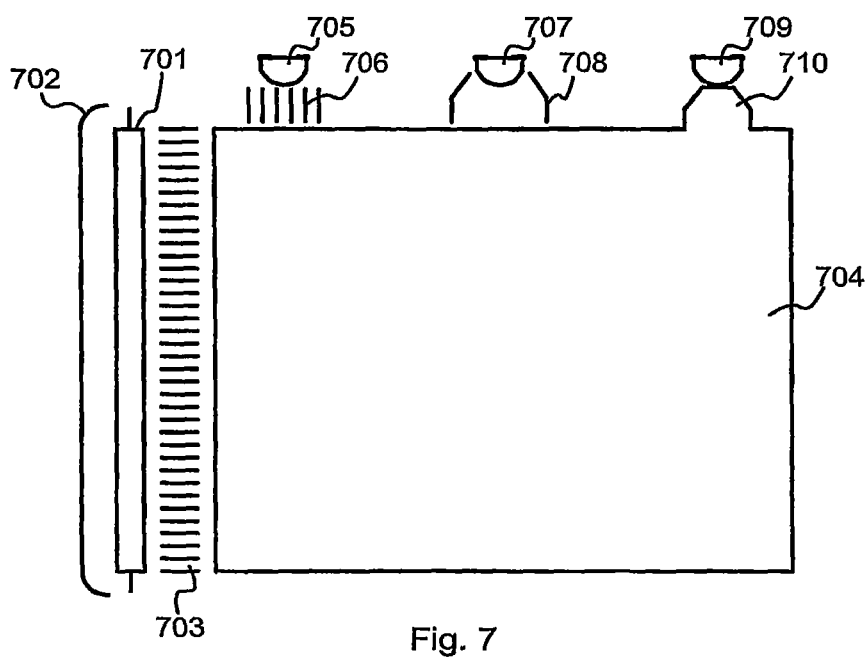
FIG. 7 illustrates some aspects of using certain light sources and incoupling arrangements.

Typical light sources to be used in embodiments of the invention include, but are not limited to, LEDs (light-emitting diodes) and cold cathode tubes. FIG. 7 illustrates schematically some possible ways of using them. Including several different alternatives in one drawing only serves compact representation; typically if one way of generating light and coupling it into a light guide is selected, it is used consistently in an electronic apparatus. A cold cathode tube 701 is equipped with a reflector 702 and a collimator 703 in order to make as much as possible of the generated light to propagate into the light guide 704 in the direction that in FIG. 7 is from left to right. One LED 705 is shown as having a collimator 706; the installation location of one LED 707 is equipped with light-directing reflective walls 708, and for one LED 709 the edge of the light guide 704 defines an extension 710 that reaches to the LED 709 and has side walls designed so that total reflections act in a similar light-directing way as the reflective walls 708 used for the adjacent LED 707.

In general, side feeding is believed to be the best choice for coupling light into a planar light guide. Problems may rise in thin (thickness<0.5 mm) light guides, especially if light should be made to propagate into a strictly confined direction in order to effectively utilise direction-dependent outcoupling structures. If the light guide is thin, also the LEDs should have as low profile as possible. However, it is typical to most commercially available low-profile LEDs that their emission pattern is fan-shaped and relatively wide. Light emitted to a direction that differs much from the nominal emission direction is likely to cause crosstalk between graphic markings consisting of differently oriented direction-dependent outcoupling structures.

One possible solution would be to redesign the transparent plastic envelope of the low-profile LED so that it would have collimating, lens-like properties and limit the width of the fan-shaped emission pattern. The width of the fan-shaped emission pattern is at least partly due to the fact that many low-profile LEDs have been designed for backlighting liquid crystal displays, where the backside illumination should be free of any kind of stripes and other non-homogeneities. Illuminating keypads has the advantage that the keys of a keypad typically appear in more or less straight rows and columns, so it does not matter if light coming from a point-like light source is mostly confined to a stripe across the light guide, as long as that stripe coincides with a row or column of keys (or more generally: discrete parts that should be selectively illuminated).

Figure 8:
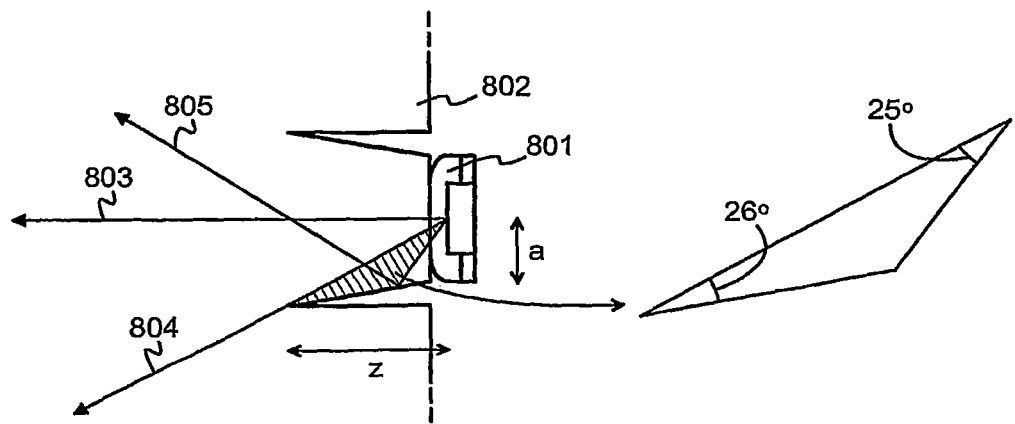
FIG. 8 illustrates certain geometric aspects.

FIG. 8 illustrates a light source and a light input section of a light guide. The light input section is designed to collimate the light emitted from a LED 801 at the stage of coupling it into a light guide 802. The LED 801 is located at the edge of the light guide 802, with its nominal emission direction 803 directed into the light guide in a direction perpendicular to the general form of the light guide edge. On both sides of the LED, the edge of the light guide defines a triangular recess. Experiments suggest that with two kinds of direction-dependent outcoupling structures (not shown) with their orientations perpendicular to each other, light emitted from an essentially point-like source like the LED 801 should not deviate more than .+-.30 degrees from the nominal emission direction 803 in order to avoid crosstalk. The direction of one ray 804 deviating by 30 degrees is shown in FIG. 8.

Let us assume that the light guide 802 is made of polycarbonate that has a refraction index 1.59. Snell's law gives approximately 39 degrees as the critical angle for total reflection. Let us further assume that the viewing angle of the LED 801 is 110 degrees, i.e. a maximally deviating emitted ray would initially have a 55 degrees difference to the nominal emission direction 803. A light ray 805 is assumed to have been originally emitted to such a maximally deviating angle. We aim at a geometry in which the incident angle of ray 805, when it hits the polycarbonate/air interface at the edge of the recess, is 39 degrees.

On the right in FIG. 8 is an enlarged representation of the hatched triangle. The rightmost sharp angle is 55−30=25 degrees (the separation between the emission directions of rays 804 and 805). The blunt angle is 90+39=129 degrees (normal direction to the recess edge plus the incident angle of ray 805). Thus the leftmost sharp angle is 180−129−25=26 degrees. From this we may deduct that the top angle of the triangular recess is 4 degrees. A short trigonometric calculation shows that with the values used in this example, the distance "z", which is essentially equal to the depth of the triangular recess, is about 1.97 times the half-width "a" of the LED. Typical values for "a" are in the range of 1.0-1.5 mm, but the invention does not exclude other kinds of LEDs. Similar dimensioning calculations are easily made for other numeric values.

Figure 9:
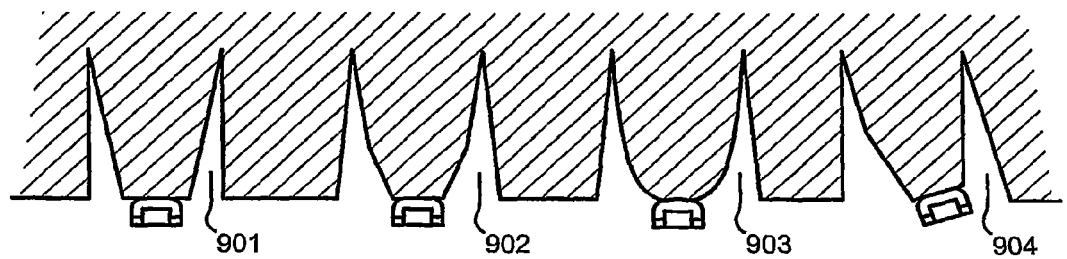
FIG. 9 illustrates some possible ways of designing a light guide edge.

FIG. 9 illustrates some examples of differently formed light input sections at the edge of a light guide. On the far left, the recesses 901 of the light input section are essentially similar to what was explained above in association with FIG. 8. Depending on the viewing angle of the LED and other considerations, it may be advantageous to make the reflecting edges of the recesses consist of several differently directed segments, all of which are optimised to reflect those rays that hit just that segment. This is illustrated in the recesses 902 of the next light input section. Edges of the recesses may be curved, like those 903 of the next light input section in FIG. 9. It is not necessary to direct the nominal emission direction of the LED perpendicularly into the light guide; the asymmetrically designed recesses 904 of the rightmost light input section in FIG. 9 may cause the eventual general propagation direction of light to be different from the nominal emission direction.

Figure 10:
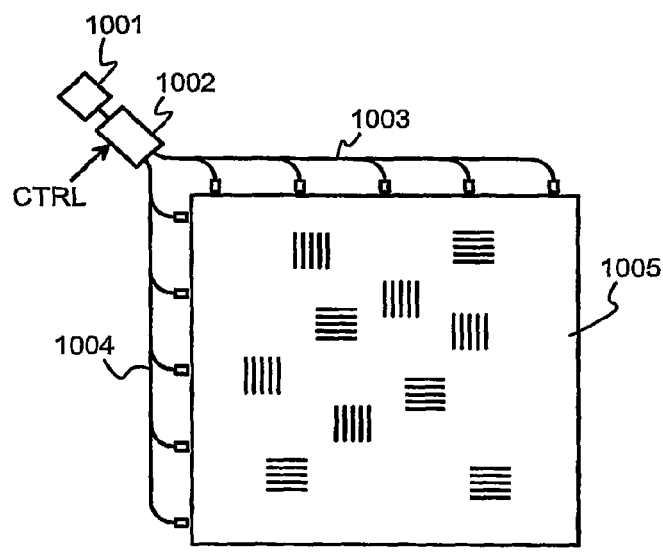
FIG. 10 illustrates the use of a single light source.

It is not necessary to use separate light sources for generating light that propagates into at least two distinct general propagation directions in a light guide. FIG. 10 illustrates schematically an arrangement in which a light source 1001 is configured to emit light into an optical switch 1002. Depending on the control signal delivered to the optical switch 1002, it directs light selectively to none, one or both of the light distribution subsystems that here are shown to consist of optical fibre networks 1003 and 1004. These in turn conduct light to the two different sides of a light guide 1005 and emit the light into the light guide, where light thus has two perpendicular general propagation directions selectively applicable.

Figure 11:
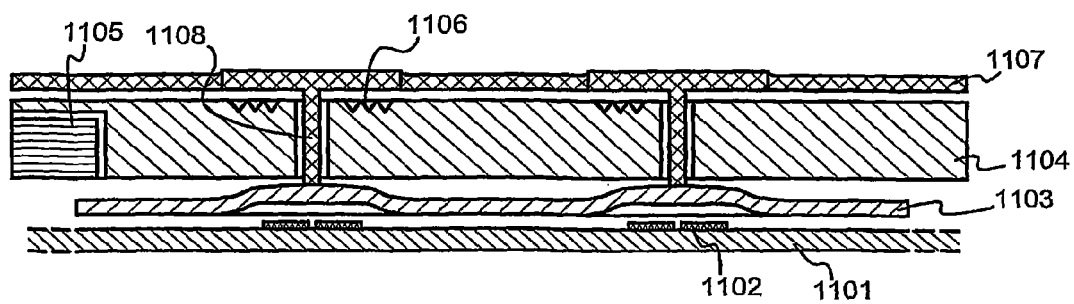
FIG. 11 illustrates the structure of a keypad.

FIG. 11 is a schematic cross-sectional representation of a keypad according to an embodiment of the invention, where changing graphics are implemented with direction-dependent outcoupling structures on a surface of a light guide. On a top of a circuit board 1101 there are conductive couplings 1102 close to each other. The conductive insides of domes in a dome sheet 1103 are configured to selectively connect some of the couplings 1102 to each other when keys are pressed. On top of the dome sheet 1103 there is a light guide 1104. An illumination arrangement enables selectively emitting light into at least two general propagation directions in the light guide 1104. One low-profile LED 1105, which is part of the illumination arrangement, is shown in the drawing. At least one surface of the light guide 1104 comprises direction-dependent outcoupling structures, of which the prisms 1106 are schematically shown on the top surface of the light guide 1104. The topmost layer of the keypad is a key mat 1107. From each key in the key mat 1107 an actuator 1108 reaches through a hole in the light guide to the top surface of a corresponding dome in the dome sheet 1103. In order to let through the light coupled out by the direction-dependent outcoupling structures, the key mat 1107 comprises transparent areas at locations that coincide with the direction-dependent outcoupling structures.

In some cases it is possible to use a key mat also as a light guide. In that case it is usually recommendable to produce the direction-dependent outcoupling structures on the bottom surface of the combined key mat and light guide, so that they do not wear in use.

The principle of making graphic markings change in the user interface of an electronic device by selectively making light propagate in discrete directions in a light guide and using direction-dependent outcoupling structures can be applied also to other user interface components than keypads. For example, we may assume that the light guide 704 in FIG. 7 is the light guide of a backlighted display, for which normal illumination is produced with the cold cathode tube 701, reflector 702 and collimator 703. In order to selectively create special effects like icons in the display, the light guide contains direction-dependent outcoupling structures (not shown)

that are oriented in such a way that they do not cause significant outcoupling of light from the cold cathode tube 701. Only when light is made to propagate in the light guide in the other general propagation direction by using perpendicularly placed light sources, like the LEDs 705, 707, and 709 shown in FIG. 7, significant amounts of light is coupled out due to the direction-dependent outcoupling structures, and the special effects appear.

Another user interface component that may benefit from the use of changing illuminated graphic markings is the outer cover of the electronic device. Transparent parts of an outer cover may themselves act also as light guides, or separate light guides can be used below the transparent parts of an outer cover. This example underlines the fact that the light guide, a surface of which comprises direction-dependent outcoupling structures, does not need to be flat or planar.

Figure 12:
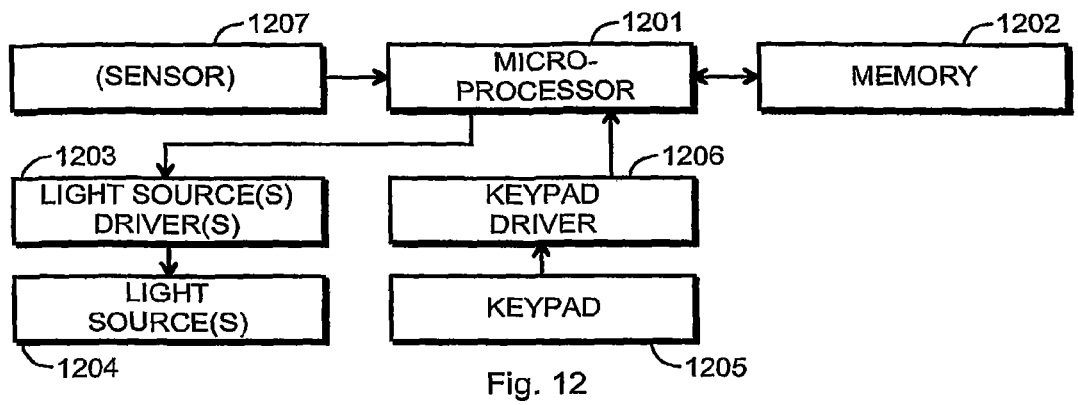
FIG. 12 illustrates functional blocks of an electronic device.

FIG. 12 illustrates some aspects of an electronic device with illuminated effects at its user interface according to an embodiment of the invention. A microprocessor 1201 is configured to control features of the user interface. This task it accomplishes by executing computer-readable instructions stored in a memory 1202 in the form of a computer program. According to the instructions, the microprocessor 1201 sends signals to a light source driver (or a number of light source drivers) 1203. These understand said signals as commands for switching on and off certain light source(s) 1204. The electronic device may comprise a keypad 1205 coupled to an input of the microprocessor 1201 through a keypad driver 1206. When a key is pressed in the keypad 1205, the keypad driver 1206 converts the resulting electric effect into a digital word that it sends to the microprocessor 1201. One of such digital words, or a combination of certain successive digital words, may be configured to mean a command for changing some features of the user interface illumination, in which case giving such an input command through the keypad 1205 triggers the microprocessor 1201 to issue a command to the light source driver 1203 that results in a change in the way in which a user perceived some illuminated graphic markings in the user interface.

It is also possible to equip the electronic device with a sensor 1207 adapted to sense a change in the way in which a user handles the device. For example, the sensor 1207 may be a direction sensor that detects, whether the user holds the device in a portrait or landscape orientation. In such a case the sensor gives a corresponding indication to the microprocessor 1201, which takes appropriate action to change the illumination of user interface features so that a user perceives some illuminated graphic markings in the correct orientation.

Changes in the orientation of illuminated graphic markings may be accompanied with other changed controlled by the microprocessor 1201. For example, taking the above-mentioned example of changing the illuminated graphic markings on a keypad depending on the orientation of the device, the microprocessor and the keypad subsystem must be configured to correctly interpret all key presses so that they convey the appropriate input signals that the user wanted to give. If the illuminated graphic marking on a key is changed, the look-up table that governs interpretations between digital words from the keypad driver and intended meanings must be changed accordingly. It is straightforward as such for a person skilled in the art to compose the computer-readable instructions executed by the microprocessor 1201 so that such synchronised changes in the operation of the user interface are taken into account.

Figure 13:
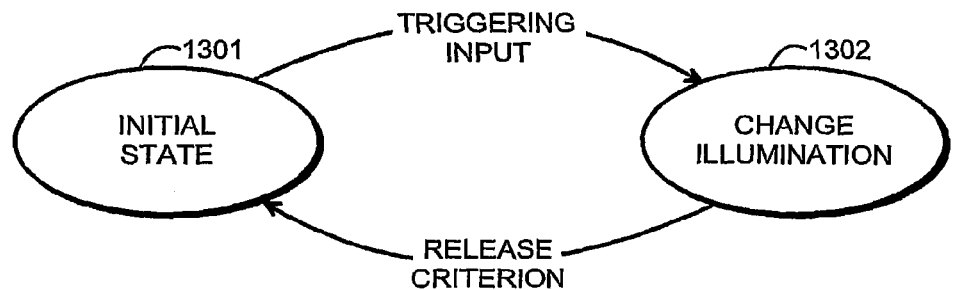
FIG. 13 illustrates transitions between states and FIG. 14 illustrates a possible flow of operations.
Figure 14:
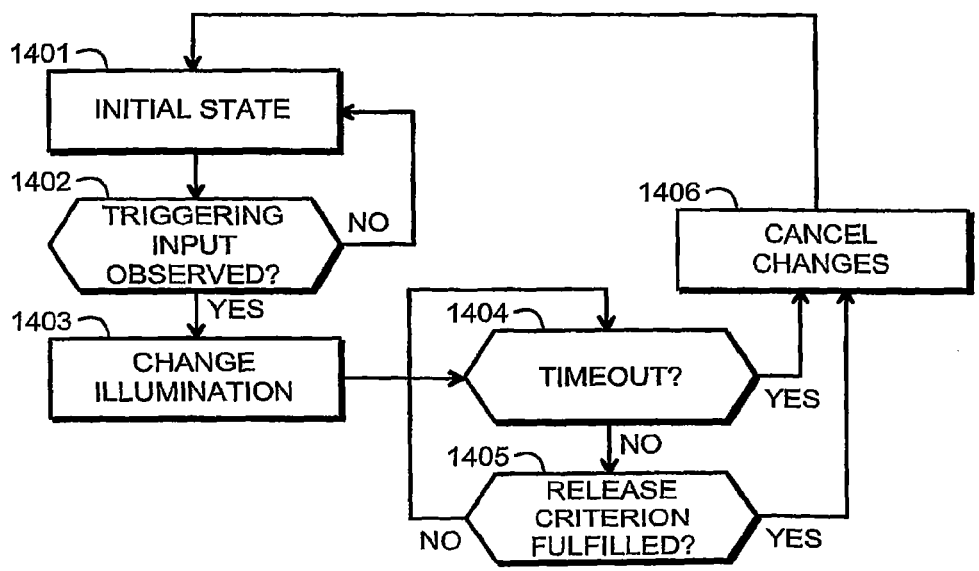

FIGS. 13 and 14 illustrate certain computer program product aspects of embodiments of the invention. FIG. 13 is a state diagram representation, in which the electronic device is in an initial state 1301 until the occurrence of a triggering input causes a transition to another state 1302 in which the device changes the illumination of its user interface. The user perceives this as a change in the illuminated graphic markings he sees. Return to the initial state 1301 takes place at the fulfillment of a release criterion. A return is understood as cancelling the changes in the user interface illumination. FIG. 14 is a flow diagram, according to which the operation of the electronic device circulates through steps 1401 and 1402 until the check at step 1402 indicates that a triggering input has been observed, which causes a transition to changing the user interface illumination at step 1403. In FIG. 14 we assume that cancelling the changes at step 1406 may take place either after a certain timeout (step 1404) or at the fulfillment of some other release criterion (step 1405).

A structural module according to an embodiment of the invention for use in an electronic device comprises at least the light guide. The structural module could also be a larger entity, for example a keypad module that comprises the light guide an a key mat with transparent or translucent areas configured to let through the light coupled out of the light guide by the direction-dependent outcoupling structures. A display module could contain the light guide and a display panel. Also the light sources, like LEDs or cathode ray tubes, could be included in the structural module.

What is claimed is:

1. An apparatus, comprising:
   a light guide;
   a first light input section configured to receive light in a first direction;
   a second light input section configured to receive light in a second direction;
   first direction-dependent outcoupling structures having a length oriented perpendicular to the first direction and operable to couple out light propagating through the light guide in the first direction, wherein longitudinal ends of the first direction-dependent outcoupling structures rise smoothly from a surface of the light guide;
   second direction-dependent outcoupling structures having a length oriented perpendicular to the second direction and operable to couple out light propagating through the light guide in the second direction, wherein longitudinal ends of the second direction-dependent outcoupling structures rise smoothly from the surface of the light guide; and
   wherein the first direction-dependent outcoupling structures are oriented co-planar with and do not contact the second direction-dependent outcoupling structures.

2. The apparatus according to claim 1, wherein the second direction is different than the first direction.

3. The apparatus according to claim 2, wherein the second direction is perpendicular to the first direction.

4. The apparatus according to claim 3, wherein the first and second direction-dependent outcoupling structures comprise elongated prisms.

5. The apparatus according to claim 4, wherein a longitudinal axis of the elongated prisms in the first direction-dependent outcoupling structures is perpendicular to the first direction, and a longitudinal axis of the elongated prisms in the second direction-dependent outcoupling structures is perpendicular to the second direction.

6. The apparatus according to claim 1, wherein the first and second direction-dependent outcoupling structures comprise geometric outcoupling structures.

7. The apparatus according to claim 1, further comprising:
   a first light source located adjacent to the first light input section; and a second light source located adjacent to the second light input section.

8. The apparatus according to claim 1, wherein:
a surface of the light guide comprises pixels of a first kind and pixels of a second kind;
the pixels of first kind are mutually identical and comprise the first direction-dependent outcoupling structures;
the pixels of second kind are mutually identical and comprise the second direction-dependent outcoupling structures;
the pixels of first kind together constitute a first graphical marking; and
the pixels of second kind together constitute a second graphical marking.

9. The apparatus according to claim 1, further comprising:
a circuit board;
a dome sheet located between the light guide and the circuit board, the dome sheet comprising domes configured to enable pressing a conductive inside of a dome against couplings on the circuit board;
a key mat located on a different side of the light guide than the dome sheet; and
transparent areas in the key mat at locations that coincide with the first and second direction-dependent outcoupling structures.

10. The apparatus according to claim 1, wherein the longitudinal ends of the first direction-dependent outcoupling structures are each located on a respective proximal and distal end of the first outcoupling structures relative to the light propagating in the second direction.

11. The apparatus according to claim 1, wherein the longitudinal ends of the second direction-dependent outcoupling structures are each located on a respective proximal and distal end of the second outcoupling structures relative to the light propagating in the first direction.

12. A communications device, comprising:
a user interface component;
a light guide for conducting light to the user interface component;
a first light source configured to emit light in a first direction;
first direction-dependent outcoupling structures having a length oriented perpendicular to the first direction and operable to couple out light propagating through the light guide in the first direction, wherein longitudinal ends of the first direction-dependent outcoupling structures rise smoothly from a surface of the light guide;
a second light source configured to emit light in a second direction;
second direction-dependent outcoupling structures having a length oriented orthogonal to the second direction and operable to couple out light propagating through the light guide in the second direction, wherein longitudinal ends of the second direction-dependent outcoupling structures rise smoothly from the surface of the light guide; and
wherein the first direction-dependent outcoupling structures are oriented co-planar with and do not contact the second direction-dependent outcoupling structures.

13. The communications device according to claim 12, wherein:
the user interface component is a keypad;
the first and second direction-dependent outcoupling structures are located coincident with a key of the keypad;
an outline of an area covered by the first direction-dependent outcoupling structures constitutes a first graphical marking configured to indicate a first use of the key; and
an outline of an area covered by the second direction-dependent outcoupling structures constitutes a second graphical marking configured to indicate a second use of the key.

14. The communications device according to claim 13, further comprising:
a circuit board;
a dome sheet located between the light guide and the circuit board, the dome sheet comprising domes configured to enable pressing a conductive inside of a dome against couplings on the circuit board;
a key mat located on a different side of the light guide than the dome sheet; and
transparent areas in the key mat at locations that coincide with the first and second direction-dependent outcoupling structures.

15. The communications device according to claim 12, wherein the user interface component comprises at least one of a display and an outer cover part.

16. The communications device according to claim 12, wherein the second direction is different than the first direction.

17. The communications device according to claim 12, wherein the second direction is perpendicular to the first direction.

18. A structural module for a communications device, comprising:
a light guide;
a first light input section configured to receive light in a first direction;
first direction-dependent outcoupling structures having a length oriented perpendicular to the first direction and operable to couple out light propagating through the light guide in the first direction, wherein longitudinal ends of the first direction-dependent outcoupling structures rise smoothly from a surface of the light guide;
a second light input section configured to receive light in a second direction;
second direction-dependent outcoupling structures having a length oriented perpendicular to the second direction and operable to couple out light propagating through the light guide in the second direction, wherein longitudinal ends of the second direction-dependent outcoupling structures rise smoothly from the surface of the light guide; and
wherein the first direction-dependent outcoupling structures are oriented co-planar with and do not contact the second direction-dependent outcoupling structures.

19. The structural module according to claim 18, further comprising:
a first light source located adjacent to the first light input section; and
a second light source located adjacent to the second light input section.

20. The structural module according to claim 18, wherein the structural module is a keypad module and comprises:
a dome sheet located adjacent to the light guide;
a key mat located on a different side of the light guide than the dome sheet; and
transparent areas in said key mat at locations that coincide with the first and second direction-dependent outcoupling structures.

* * * * *